US00RE48602E

(19) United States
(12) Reissued Patent
Pittman et al.

(10) Patent Number: US RE48,602 E
(45) **Date of Reissued Patent: *Jun. 22, 2021**

(54) GUN SAFETY DEVICE

(71) Applicant: John M. Pittman, St. Albans, ME (US)

(72) Inventors: John M. Pittman, St. Albans, ME (US); Jeremy T. York, Mars Hill, ME (US)

(73) Assignee: John M. Pittman, St. Albans, ME (US)

( * ) Notice: This patent is subject to a terminal disclaimer.

(21) Appl. No.: 16/226,207

(22) Filed: Dec. 19, 2018

Related U.S. Patent Documents

Reissue of:
(64) Patent No.: 9,784,517
Issued: Oct. 10, 2017
Appl. No.: 15/327,200
PCT Filed: Apr. 13, 2016
PCT No.: PCT/US2016/027329
§ 371 (c)(1),
(2) Date: Jan. 18, 2017
PCT Pub. No.: WO2016/168327
PCT Pub. Date: Oct. 20, 2016

U.S. Applications:
(60) Provisional application No. 62/146,543, filed on Apr. 13, 2015.

(51) Int. Cl.
*F41A 17/44* (2006.01)
*F41A 17/02* (2006.01)

(52) U.S. Cl.
CPC ..... *F41A 17/44* (2013.01); *F41A 17/02* (2013.01)

(58) Field of Classification Search
CPC ..... F41A 17/44; F41A 17/42
See application file for complete search history.

(56) References Cited

U.S. PATENT DOCUMENTS 2,327,334 A 8/1943 Parker
2,479,107 A * 8/1949 Garretson ..... F41A 17/44 42/70.01

(Continued)

OTHER PUBLICATIONS

International Search Report and Written Opinion for PCT application PCT/US2016/021793 of the same applicant, May 17, 2016, 9 pp.

(Continued)

*Primary Examiner* — Jeffrey R Jastrzab
(74) *Attorney, Agent, or Firm* — Caseiro Burke LLC; Chris A. Caseiro

(57) ABSTRACT

A device for controlling access to a firearm having a muzzle with a muzzle device. The device includes a lock housing with a cavity to receive the muzzle device *and a portion of the barrel*. The device also includes a lock mechanism shaft coupled to a lock mechanism that is configured for rotational movement upon actuation of the lock mechanism. The lock mechanism shaft is coupled to a cam that moves axially upon rotation of the lock mechanism shaft. A bidirectional rotatable shaft is coupled to the cam and is insertable into the muzzle of the firearm *occupying the full length of the firearm's muzzle device, barrel and chamber*. The device also includes a plurality of arms coupled to a perimeter of the cam and arranged for pivotal and radial movement to secure the firearm muzzle in the cavity of the lock housing. A plurality of tabs are arranged on the arms for engagement with the muzzle device to retain the muzzle device within the lock housing.

16 Claims, 4 Drawing Sheets

(56) References Cited

U.S. PATENT DOCUMENTS

| | | | | |
|---|---|---|---|---|
| 4,777,753 | A | 10/1988 | Stancato | |
| 4,908,971 | A * | 3/1990 | Chaney | F41A 17/44 42/70.11 |
| 4,961,277 | A * | 10/1990 | Rosenbaum | F41A 17/44 42/70.11 |
| 5,138,785 | A | 8/1992 | Paterson | |
| 5,239,767 | A | 8/1993 | Briley, Jr. et al. | |
| 5,357,704 | A * | 10/1994 | Benkovic | F41A 17/44 42/66 |
| 5,398,438 | A * | 3/1995 | Williams | F41A 17/04 42/70.11 |
| 5,450,685 | A * | 9/1995 | Peterson | F41A 17/44 42/70.11 |
| 5,664,358 | A * | 9/1997 | Haber | F41A 17/44 42/44 |
| 5,699,687 | A | 12/1997 | Pittman | |
| 5,860,241 | A * | 1/1999 | Waters | F41A 17/44 42/66 |
| 6,202,336 | B1 * | 3/2001 | Audino | F41A 17/44 42/70.11 |
| 6,223,566 | B1 | 5/2001 | Jamison | |
| 6,374,527 | B1 | 4/2002 | Finardi | |
| 6,560,910 | B1 | 5/2003 | McLaren | |
| 6,584,718 | B1 | 7/2003 | Serrao | |
| 7,752,796 | B2 * | 7/2010 | Ramsey, Sr. | F41A 17/44 42/70.11 |
| 7,849,625 | B2 * | 12/2010 | Ligard | F41A 17/44 42/70.01 |
| 8,677,668 | B1 * | 3/2014 | Caldwell | F41A 17/44 42/70.11 |
| 8,677,672 | B2 | 3/2014 | Kennedy et al. | |
| 9,222,742 | B2 | 12/2015 | Steuwer et al. | |
| 10,030,925 | B1 * | 7/2018 | Bianchin | F41A 17/44 |
| 10,190,838 | B2 * | 1/2019 | Pittman | F41A 17/44 |
| 2001/0034961 | A1 * | 11/2001 | Hickerson | F41A 29/02 42/70.11 |
| 2002/0133999 | A1 * | 9/2002 | Polenz | F41A 17/44 42/70.11 |
| 2002/0152662 | A1 * | 10/2002 | Lane | F41A 17/44 42/70.11 |
| 2003/0115785 | A1 | 6/2003 | Milo | |
| 2003/0221351 | A1 * | 12/2003 | Barber | F41A 17/44 42/70.11 |
| 2004/0011100 | A1 * | 1/2004 | Ross | E05B 19/00 70/408 |
| 2004/0025394 | A1 * | 2/2004 | Young | F41A 17/44 42/70.11 |
| 2004/0200113 | A1 * | 10/2004 | Lawless | F41A 33/00 42/70.08 |
| 2004/0200114 | A1 * | 10/2004 | Milo | F41A 17/44 42/70.11 |
| 2006/0288624 | A1 | 12/2006 | Ha | |
| 2011/0173860 | A1 * | 7/2011 | Arendt | F41A 17/44 42/70.11 |
| 2012/0030982 | A1 * | 2/2012 | Inskeep | F41A 17/44 42/70.01 |
| 2015/0233661 | A1 * | 8/2015 | Koerner | F03G 3/04 42/70.11 |

OTHER PUBLICATIONS

International Search Report and Written Opinion for corresponding PCT application PCT/US2016/027329, Jul. 15, 2016, 7 pp.

* cited by examiner 4030
4010
4021a
4021
4021b
4000
4000a
4021c
4021d
45
4110
4110a 4030
4010
4021a
4021c
4021b
4021d
4021e
4021
45
4110
4110a

4030

4010
4010a
4021a
4021c
4025
4012
4012a
4012b
4013
4013a
4014
4022
4022a
4020
4020a
4090
4080
4085
4110
4110a
4110b
4100
4100a
4100b
4100c
4021c
4021d
4021e
4021b
4075
4023
4015b
4015a
4015c
4015d
4015
4010
4015a
4000
4000a 4030
12
DISTAL
11
PROXIMAL

GUN SAFETY DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to devices for gun safety. In particular, the present invention relates to devices that prevent unauthorized use of a gun having some type of muzzle device coupled thereto.

2. Background of the Invention

The present invention is an advancement over the gun safety device described in U.S. Pat. No. 5,699,687 that was issued on Dec. 23, 1997. The entire content of U.S. Pat. No. 5,699,687 is incorporated herein by reference. Improvements have been made to enhance the functionality of the device. Those improvements include the elimination of some components of the original device, the modification of some components of the original device and the addition of new components. A new actuating means of securing a firearm is introduced in the present invention. The invention described herein improves overall safety certainty, strengthens structural integrity, improves anti-tampering properties and reduces manufacturing costs. The invention can be used to secure a firearm that includes some type of muzzle device, such as a flash hider, a flash suppressor, a muzzle brake and/or a compensator. The invention also accommodates those firearms that include manufactured indentations, flats and cuts, including those made in the muzzle vicinity of the firearm's slide.

SUMMARY OF THE INVENTION

The invention is designed to secure guns having a muzzle device such as a flash hider, a flash suppressor, a muzzle brake and/or a compensator. The invention may also be used to secure firearms that possess a blade-like front sight, a bead-like front sight, and firearms with vertical and near-vertical serrations, cuts and/or other indentations in the muzzle vicinity of the firearm. With respect to the original device described in the cited patent, most, but not all, improvements are to specific components: improving their function, strengthening them and their anti-tamper properties and making them easier and cheaper to produce. A few new components are added. A few components have been eliminated. This device is designed to further self-defend itself and resist tampering and defeat by commonly available means including: brute force, crushing, cutting, drilling, grinding and reverse installation. A goal of the device of the present invention is to damage or destroy, both itself and the firearm, before it is compromised.

The device includes a lock housing with a base component coupled to a receptacle component, wherein the receptacle component includes a cavity configured for insertion therein of the muzzle device and at least a portion of the [muzzle] *barrel*. It also includes a key structure coupled to the base component of the lock housing, wherein the key structure is arranged to receive a key. A lock mechanism is coupled to the key structure and arranged for actuation by the key. A lock mechanism shaft is coupled to the lock mechanism and is configured for rotational movement upon actuation of the lock mechanism. The device also includes a cam having a distal end and a proximal end, wherein the distal end of the cam is in contact with the lock mechanism shaft such that rotational movement of the lock mechanism shaft causes axial movement of the cam. A bidirectional rotatable shaft is coupled to and within the proximal end of the cam and arranged for insertion into the muzzle of the firearm. A plurality of arms is coupled to a perimeter of the cam and arranged for pivotal and radial movement to secure the firearm muzzle in the cavity of the lock housing. The arms include a plurality of tabs arranged on the plurality of arms for engagement with an exterior surface of the muzzle device to retain the muzzle device within the lock housing. The device also includes near the proximal end of the cam a notched disk with circumferential notches or indentations, wherein the notched disk is made of a material that protects distal and external surfaces of the muzzle device from abrasion and damage. A conically shaped bushing is located proximal to the notched disk arranged to occupy a cavity within a distal region of the muzzle device. The device further includes a snap ring arranged to fasten the notched disk and the conically shaped bushing together, wherein the bidirectional rotatable shaft is configured to protrude from the proximal end of the cam, penetrate through the notched disk, the conically shaped bushing and the snap ring and extend into the firearm barrel. The device optionally includes a semi-flexible, bi-directionally rotating wand coupled to a proximal end of the bidirectional rotatable shaft, wherein the wand is arranged to extend through a remainder of an internal length or bore of the barrel of the firearm and the full length of its chamber, thus preventing the loading of a live round of ammunition in the firearm. The plurality of arms and the tabs are configured to receive and grasp blade-like front sights that are common to most firearms including pistols, revolvers and many rifles as well as the bead-like front sights common to shotguns. The plurality of arms and the tabs may also be configured to receive and grasp vertical and near-vertical serrations, cuts and other indentations of the muzzle of the firearm. The device includes a self-protective cage-like structure arranged to protect the internal length of the device and the firearm against tampering and defeat. The cage-like structure may include a key disk, one or more support disks, lock housing rods or pins and a bushing, wherein the one or more support disks are located within an interior of the bushing and the lock housing configuration to provide internal lateral support against attempted compromise by crushing. The cage-like structure may be configured to shelter multiple types of firearms, multiple types of muzzle devices and multiple muzzle configurations. The bushing enjoys bidirectional rotational freedom of movement and internally protects the entire lock housing, cavity, all components within the lock housing [and at least a portion of the muzzle device], *all of the muzzle device and at least a portion of the barrel.* The bushing may be a unitary structure or it may be a combination of bushing components. The device may include a pyric disk located adjacent to the lock mechanism. The device may include a lanyard retainer coupled to the lock housing. The conically shaped bushing may be superimposed over the bidirectional rotatable shaft to occupy the cavity within the distal region of the muzzle device. The conically shaped bushing and the notched disk center stabilize the firearm within the cavity of the lock housing during activation so as to eliminate looseness.

The following detailed description, the accompanying drawings and the appended claims will further describe the present invention.

DETAILED DESCRIPTION OF THE INVENTION

Figures 1, 2:
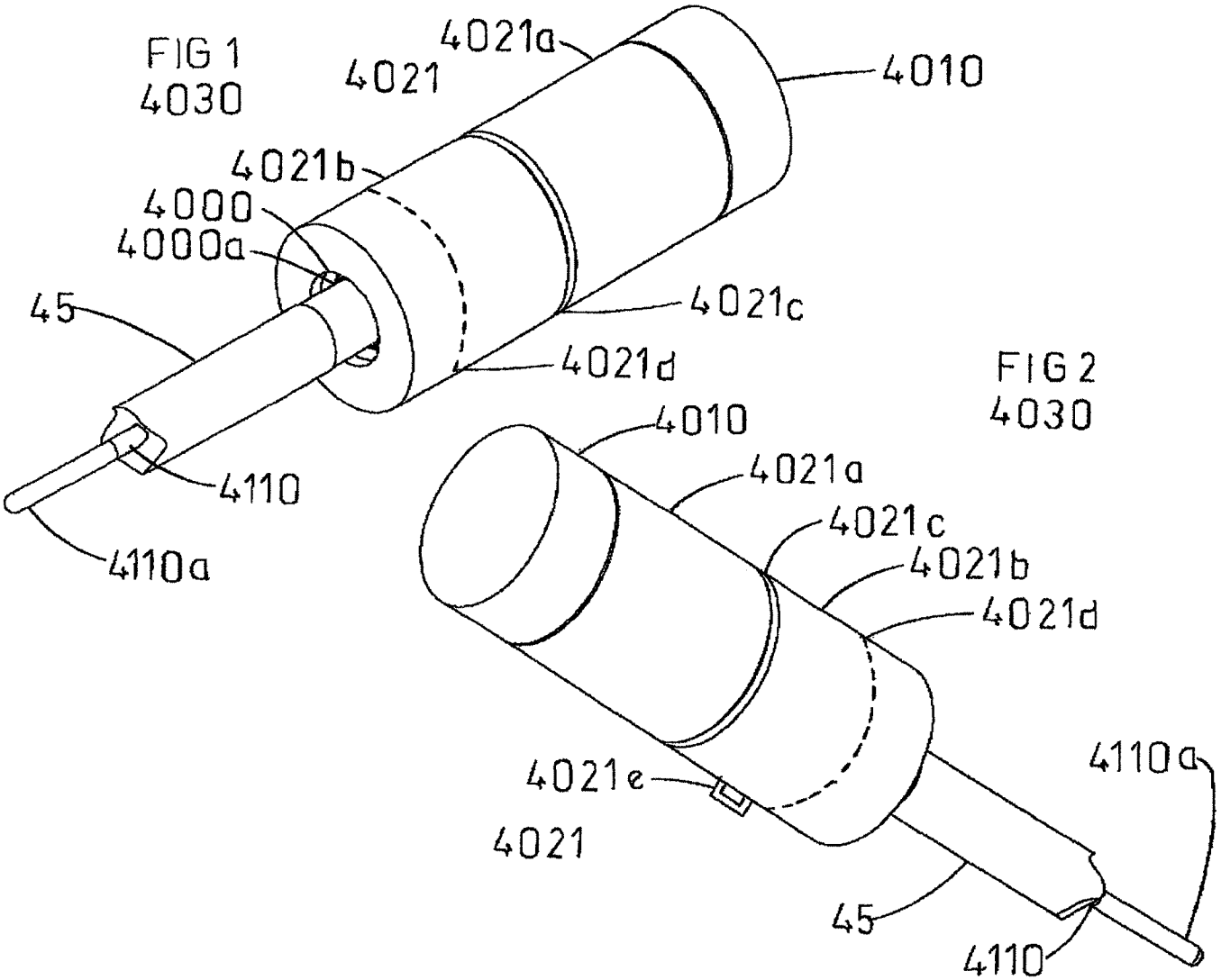
FIG. 1 is a perspective view of the firearm safety device of the present invention.
FIG. 2 is a perspective view of the present invention.
Figure 3:
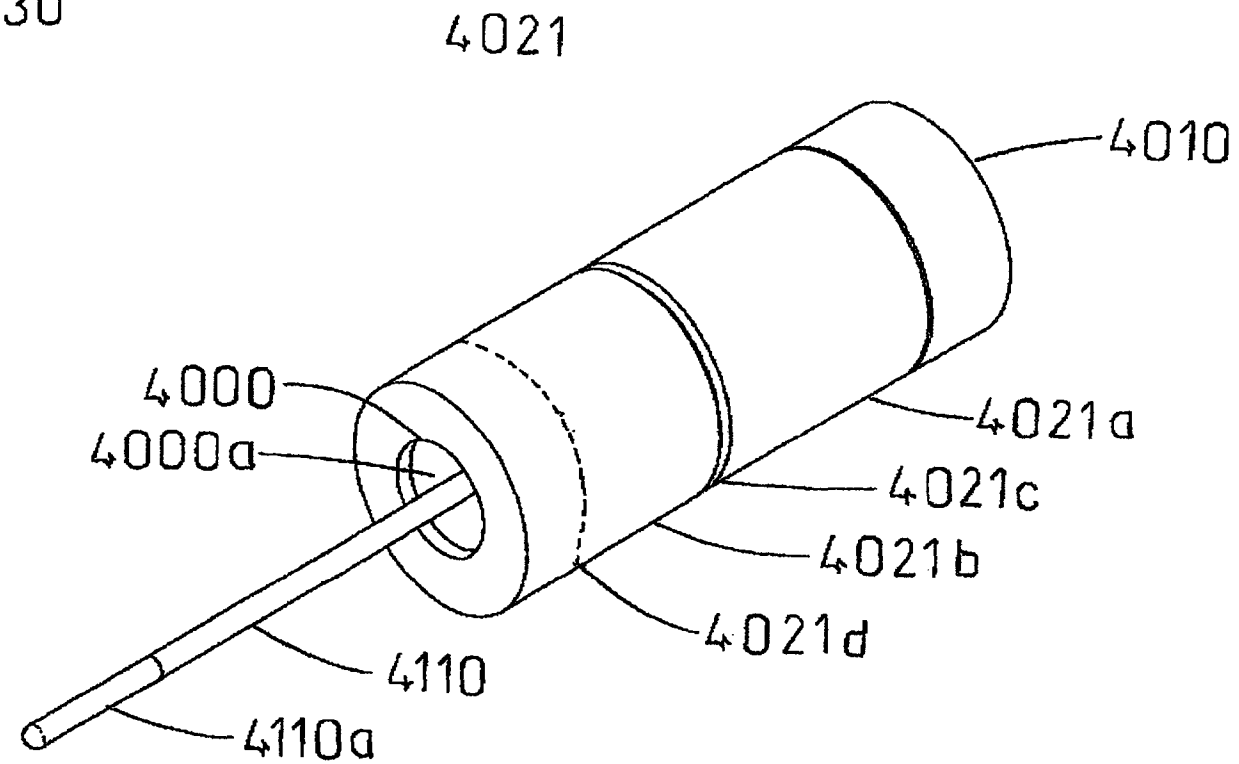
FIG. 3 is a perspective view of the firearm safety device of the present invention.
Figure 4:
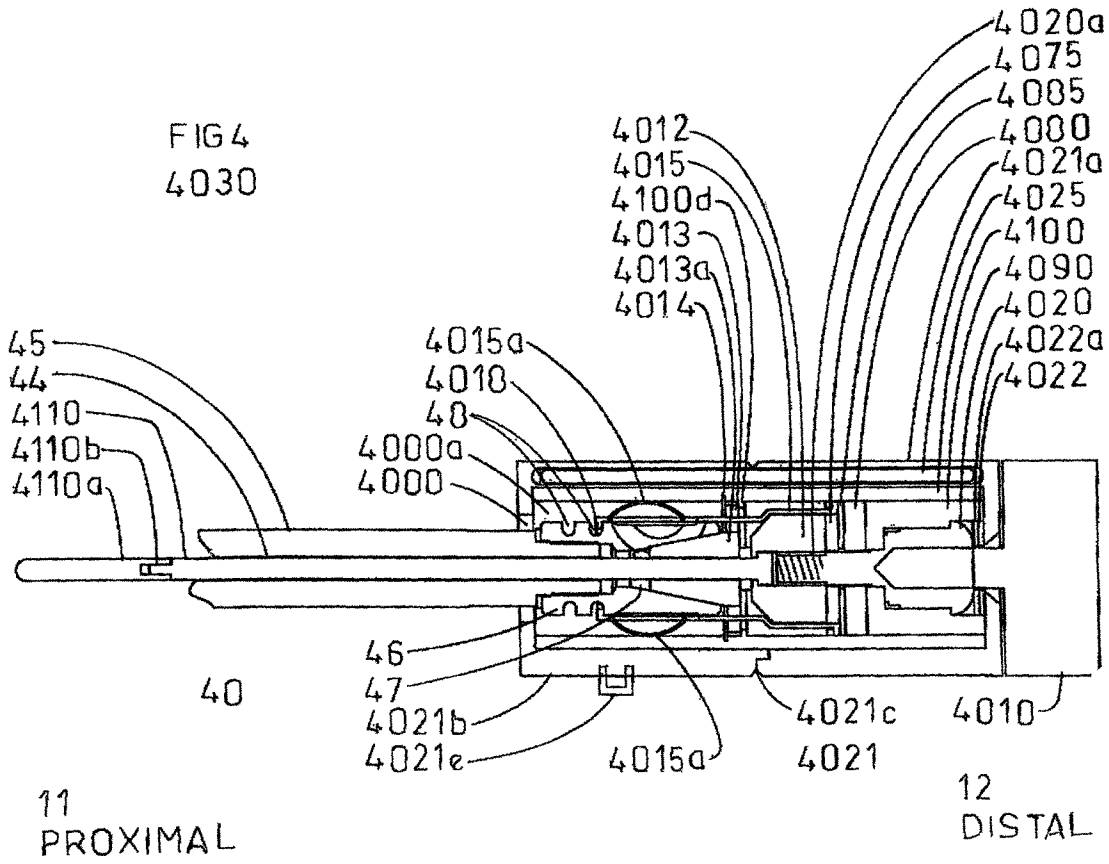
FIG. 4 is a perspective dissected view of the present invention.

A gun safety device 4030 of the present invention shown in FIGS. 1-5 is a type of locking mechanism that can be used to prevent firearm operation for those firearms having a muzzle device 46 such as a flash hider, a flash suppressor, a muzzle brake and/or a compensator affixed to the muzzle by preventing ammunition from being chambered by blocking the barrel 45 and chamber of the firearm 40. The device 4030 may also be used to prevent usage of firearms that possess other configurations of what are referred to herein as muzzle devices, such as a blade-like front sight, a bead-like front sight and firearms with vertical and near-vertical serrations, cuts and/or other indentations in the muzzle vicinity of the firearm 40.

The device 4030 includes an Original Equipment Manufacturer (OEM) key activated security pin tumbler or wafer tumbler screw-type lock mechanism 4020, a bi-directionally rotating shaft 4110, an arms foundation 4075, arms 4015 with tabs 4018 thereon, a lock housing 4021 and a lock foundation 4090 among other components. When the lock mechanism 4020 is actuated, a lock mechanism shaft 4020a that may be a threaded shaft 4020a upon a proximal terminus of the lock mechanism 4020 causes a cam 4012 to move axially in both proximal 11 and distal 12 directions, controlling a plurality of spring-urged arms 4015. Near the proximal end of this cam 4012 is a replaceable notched disk 4013, with circumferential notches or indentations, and that are shown as cross shaped in FIG. 5. The disk 4013 is made of a material that protects distal and external surfaces of the muzzle device 46 from abrasion and damage. Located proximally to the notched disk 4013, is a replaceable conically shaped bushing 4013a that occupies a cavity 47 within the distal 12 region of the firearm muzzle device 46. The notched disk 4013 and conically shaped bushing 4013a may be fastened in place with a snap ring 4014. The bi-directionally rotating shaft 4110 protrudes from the proximal end of the cam 4012, penetrates through the notched disk 4013, conically shaped bushing 4013a and snap ring 4014 and extends into the firearm's barrel. The shaft 4110 may include a semi-flexible, bi-directionally rotating wand 4110a at its proximal end. This wand 4110a extends through the rest of the internal length or bore 44 of the barrel 45 and the full length of its chamber, thus preventing the loading of a live round of ammunition in the firearm 40.

Responding to clockwise rotation of key structure 4010 and key 4010a, the cam 4012 migrates proximally 11 and urges all arms 4015 radially to the point where the firearm's muzzle or the muzzle device 46 located on the muzzle enters through an opening 4000, into the cavity 4000a, on a proximal end of lock housing receptacle 4021b where it is sheltered and superimposes over the device's shaft 4110, wand 4110a and conically shaped bushing 4013a. One or more marks, rings or circumferential grooves 4021d on the external surface of the lock housing configuration 4021 indicates to the user where to line up the firearm's muzzle and/or muzzle device against components within the lock housing configuration 4021 for activation to occur.

When the key structure 4010 or key 4010a is rotated in a counterclockwise manner, the cam 4012 migrates in a distal 12 direction, the arms 4015 are pivotally and inwardly urged by dorsal arm support springs 4015a thereon. On the ventral surface 4015b of each arm 4015 and/or at its terminus 4015c, is a very hard, reinforced and cushioned tab 4018 with dimensions that conform closely to the above-mentioned one or more grooves 48 on the muzzle device 46. These tabs 4018 firmly contact and grasp inner and lateral surfaces of grooves 48 of the muzzle device 46, thereby securing the firearm 40 and completing the activation or locking function of the device 4030. Similarly, the arms 4015 and tabs 4018 may be modified such that they grasp indentations and/or serrations on distal surfaces of the firearm's slides (common to pistols). Alternatively or in addition, the arms 4015 and tabs 4018 may be modified to receive and grasp blade-like front sights that are common to most firearms, including pistols, revolvers and many rifles as well as the bead-like front sights common to shotguns.

Likewise, deactivation of the device 4030 takes place when one rotates the key structure 4010 or key 4010a in a clockwise direction, which causes the cam 4012 to migrate proximally, urging all arms 4015 radially to the point where the tabs 4018 thereon release their grasp within the grooves upon the muzzle device 48 or the indentations and/or serrations on distal surfaces of the firearm. At this point, the firearm's muzzle device or muzzle may be withdrawn through the device opening 4000 completing the deactivation or unlocking function of the device 4030.

In the present invention, actuation takes place in the distal region 12 of the firearm 40, in the distal region 12 of the device 4030, within the cavity 4000a on the proximal 11 end of the lock housing configuration 4021 securing against external surfaces of the firearm's muzzle device 46, serrations, cuts and/or indentations on the slide and/or on front sights and/or the muzzle vicinity. Securing the firearm is accomplished by the "passive" occupation of the full length of the bore 44 and chamber with shaft 4110 and/or wand 4110a components; thus, the new activating means referenced above.

The device 4030 includes a self-protective cage-like structure established by key disk 4022 and support disk 4022a, as well as lock housing rods or pins 4025 and bushing 4100. Singular or multiple internal support disk 4085 reside within interior 4100c of the bushing 4100, within the lock housing configuration 4021, at strategic locations and provide internal lateral support against attempted compromise by crushing. These components are made of durable, very hard, high quality and non-corrodible materials, such as a stainless steel. They have the same roles and characteristics as previously described in the original invention. This improved cage-like structure self protects the internal length and breadth of the device 4030, and the firearm 40, against tampering and defeat and may be modified to shelter multiple types of firearms 40, multiple muzzle devices 46 and multiple muzzle configurations.

Bushing 4100 enjoys bi-directional rotational freedom of movement. It is larger than the corresponding one of the original safety device and internally protects the entire lock housing configuration 4021, cavity 4000a, all of the components within the lock housing configuration 4021 and all, or most of all, of the [firearms] *firearm's* muzzle device 46 *and a portion of the firearm's barrel 45*. This component bolsters the above cage-like structure and serves as a self-protective and anti-tampering element. The bushing 4100 may be a unitary structure or it may be a combination of bushing components such as subcomponent 4100a and subcomponent 4100b.

In contrast to the configuration of the original invention, in the present invention represented by device 4030, a new lock housing configuration 4021 comprising base component 4021a and receptacle component 4021b is much longer, and that are joined together, such as by welding, at a weld point 4021c, during the assembly process. These components are manufactured of a very hard, high quality and corrosion resistant material, such as a stainless steel. The exterior surfaces of the lock housing configuration 4021 may be finished and/or knurled to obscure any weld point if desired.

The opening 4000 and cavity 4000a at the proximal end 11 of the lock housing receptacle 4021b accepts and shelters all, or most all, of the length of the muzzle device 46 and a distal section of the firearm's barrel 45 that is proximal to the muzzle device 46 and in a random fashion except for model-specific firearm safety devices. Presently, the lock housing configuration 4021 and its proximally positioned orifice 4000 may be modified to shelter multiple firearm types including generic or specific models of firearms. The configuration of the 'shelter' may take two forms: first, a "generic" form that will accept any firearm having outside muzzle vicinity dimensions are less than the internal dimensions of the cavity opening 4000; and second, a "model specific" form that conforms to and will accept a specific model of firearm. The cross sectional shape of the device 4030 that serves firearms, with components that have a circular cross section, may be round. The cross sectional shape of the device 4030 that serves firearms, with components that have a square and or rectangular cross section at the muzzle vicinity, may be square or rectangular as is found in the original embodiment. Within both generic and model specific scenarios, barrel lengths are assumed to be equal or nearly equal.

All of the internal components within the lock housing 4021 configuration, in the improved design of the present invention are accessible while the device is disengaged and removed. Some of these components are accessible by the removal of a snap ring 4014 fastening means. The snap ring 4014, which is replaceable, serves to retain the above and distally 12 located notched disk 4013 and conically shaped bushing 4013a in place, against an internal circumferential tab 4100d within the bushing configuration 4100. Snap rings may also fasten the above additional support disk 4085 in place. Snap rings engage within an interior channel, cut within the bushing interior 4100c or between components comprising the bushing 4100a and 4100b. Optional fastening means are press fitted clamps upon counterbore screws 4023 as well as the counterbore screws 4023 by themselves. Multiple counterbore screws 4023 fasten the arms foundation 4075, support disk 4085, pyric disk 4080 and lock foundation 4090 to the interior face of the lock housing base 4021a. These stainless steel counterbore screws 4023 may be accompanied with small, superimposed (over their shaft) and bi-directionally rotating bushings, serving as an anti-tamper means. Added benefits to this configuration is that a miscreant, who gains possession of a gun with this device installed, has no obvious place to begin in their quest to defeat it.

The lock housing configuration 4021 of the device 4030 of the present invention has been modified to include a lanyard retainer, which may be a press fitted U-shaped component 4021e (as shown), a cave-like structure machined into the lock housing configuration 4021 or by other means.

Lock foundation 4090 in conjunction with the above mentioned counterbore screws 4023 prevents rotation of the lock mechanism 4020 within the lock housing configuration 4021. This lock foundation component 4090 component is a collar, that circumferentially conforms to the inside diameter of the lock housing base 4021a and internally conforms to the physical characteristics of the lock mechanism 4020. It is superimposed around the lock mechanism 4020 and is fastened in place by an above fastening means.

The device 4030 includes the cam 4012, which may be a shaped cam, wherein the shape may be that of a pyramid atop a box but not limited thereto. When the lock mechanism 4020 is actuated in a clockwise manner, the cam 4012 is pushed in a proximal 11 direction, urging the arms 4015, pivotably and radially outward. Screw axial threading 4020a is found on the proximal 11 terminus of the lock mechanism 4020 and within a distal 12 interior 4012b and almost the full length of the cam 4012. The cam 4012 is not rotatable, in that faces 4012a thereon, located proximally 11 are in direct contact with distal 12 and ventral 4015b surfaces on the arms 4015, which are urged radially and inwardly by the arm support springs 4015a thereon. With respect to the original device, the cam 4012 is not constrained by material cross sectional requirements, is less vulnerable to tampering and defeat, is expected to be much less expensive to manufacture and may be modified to conform to the type of firearm configuration, characteristics of the muzzle device and/or the muzzle in the vicinity thereof.

Figure 5:
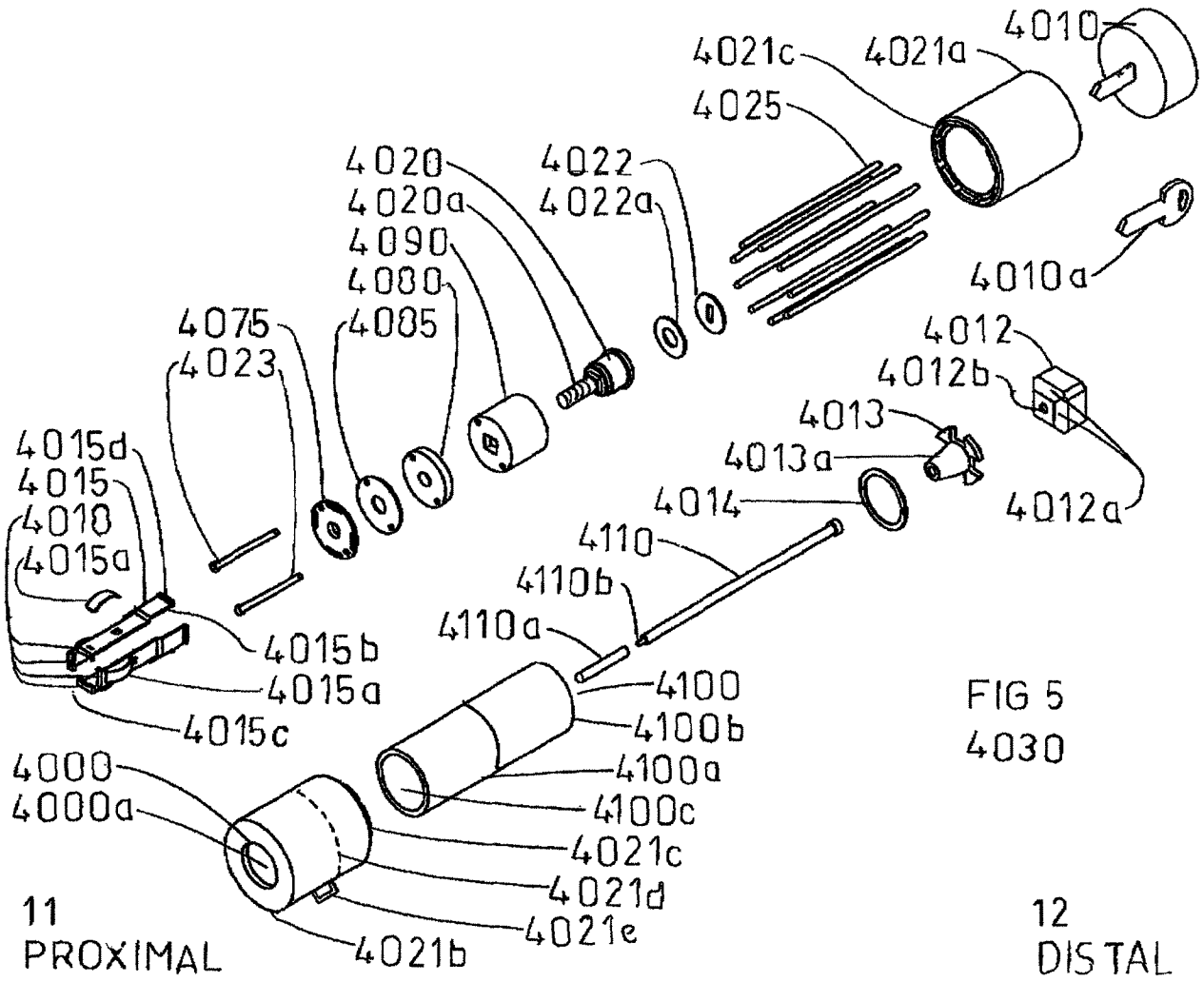
FIG. 5 is a perspective exploded view of the present invention.

As illustrated in FIG. 5, four of the arms 4015 are shown on arms foundation 4075; however, more may be used including, for example, six or nine or more of them. The device 4030 may possess more or fewer such arms 4015, with their number and sizes selected as a function of the outside diameter of the muzzle device 46 or muzzle, length of the firearm's muzzle device 46, the type and configuration of the firearm, and its muzzle vicinity' physical characteristics. These arms 4015 possess distally located tabs 4015d that are distally anchored in the arms foundation 4075 and whose arms 4015 extend proximally 11 toward the cavity 4000a that shelters the firearms muzzle.

The device 4030 includes the plurality of tabs 4018 that, when the device 4030 is actuated, migrate inwardly to occupy and grasp grooves 48, indentations and/or cut outs on the firearm's muzzle and/or muzzle device 46. The tabs 4018 may be either or both fixed (as shown) on the arms 4015 and movable, replaceable and adjustable on the arms 4015. This enables configurations of the device 4030 to conform to and secure both individual and multiple firearm muzzle devices 46. The tabs and/or the arms 4015 may be manufactured to identically conform to the physical characteristics of the muzzle device 46, indentations, including cuts and serrations, on the muzzle of the firearm slide and blade-like or bead-like front sights. These tabs may be magnetized to hasten and bolster their employment.

The device 4030 includes bi-directionally rotating shaft 4110 that extends from within the cam 4012 proximally into the barrel of the firearm 40, cooperating with the conically shaped bushing 4013a, centering and stabilizing the firearm 40 within the device cavity 4000a. Materials employed in making the shaft 4110 are selected to be soft enough not to damage the internal surfaces of the barrel *45 and muzzle device 46* of the firearm 40 when actuated and otherwise when in contact with those surfaces. Threading 4110b at the proximal end 11 of the shaft 4110 accepts mutually threaded softer rods or wands 4110a. In firearms, with short barrel lengths, the bidirectionally rotating shaft 4110 may serve in lieu of the wand 4110a.

The device 4030 includes the semi-flexible wand 4110a component that is configured for bi-directional rotational freedom of movement. It serves to fully occupy the firearm's chamber as an anti-tamper means and is arranged for fastening at the proximal end 11 of the shaft 4110 thereby occupying the remainder of the barrel 45 and all of the chamber of the firearm 40. Many models of this type of firearm have different optional barrel lengths. One or more wands 4110a, which are attachable to the shaft 4110 and replaceable, may be cut to the total length of the barrel and chamber or wands 4110a may be telescoping, in which its most proximal section is urged proximally, into the chamber 11, by internal coil springs. The telescoping nature of this embodiment of the wand 4110a allows a single wand to accommodate multiple barrel lengths. Materials employed in the manufacture of the wands 4110a are selected to be soft enough to not damage the internal surfaces of the firearm *muzzle device,* barrel and chamber and may be a hard rubber or plastic. Wand flexibility enables faster insertion and removal of the device 4030 to and from the firearm 40.

The device 4030 further includes the protective notched disk 4013 that is arranged to protect the proximal end 11 of the cam 4012 and external distal 12 surfaces of the muzzle device 46 and is made of a material or materials that are soft enough to not abrade or damage these surfaces. The outside diameter of the notched disk 4013 also serves to provide internal and lateral support to the device 4030 bushing configuration 4100 and also serves as a backstop for the conically shaped bushing 4013a. The circular notches on the circumference of this disk supports, aligns and guides the arms 4015 within the device 4030. The current configuration of arm 4015 alignment is radially outward. Another configuration which may be employed is radially inward by disks with internal circular notches corresponding to the arms that are cut within the inside diameter of a support disk 4085 or snap ring 4014. The notched disk 4013 may be expanded, modified, bolstered or merged with the conically shaped bushing 4013a to engage, support and protect a firearm's barrel, crown and muzzle vicinity.

The conically shaped bushing 4013a is superimposed over the device's bidirectionally rotating shaft 4110 and serves to occupy a cavity 47 within the distal region 12 of the muzzle device 46. Together, with the notched disk 4013, they center and stabilize the firearm within the device's cavity 4000a during activation, by eliminating looseness. This component consists of a material that will not abrade or damage the muzzle device's interior 47.

A smooth, hard plastic-like material covers the ventral surfaces 4015b of the arms 4015, the tabs 4018 on each arm 4015, the internal surface of the opening 4000 into the cavity 4000a and, optionally, within an internal lengths 4100a and 4100b of the bushing configuration 4100. These ventral surface cushions are hard, smooth, low friction and plastiklike; protecting external surfaces of the firearm's muzzle device, muzzle and front sight against abrasion, damage and facilitating both insertion and withdrawal of the firearm. These hard covers may be painted and baked on and/or heat-shrink applied. They provide component protection and also serve to reduce friction when inserting or removing the firearm from the device 4030.

The key structure 4010 may be a standard key 4010a (as shown), designed to be removed to allow the device 4030 to be maintained in a locked or unlocked position without the insertion of a key. Alternatively, the key structure 4010 may be a safety type (as shown), designed to be kept in place within the lock housing configuration 4021 so that the user of the invention may maintain the device 4030 in a locked position, while also being able to quickly unlock the device 4030 without reinsertion of the key 4010a. The surface of the key structure 4010 may be finished, knurled or otherwise modified to enhance one's grasp and handle-ability.

An additional element in accordance with this invention is a pyric disk 4080. The pyric disk 4080 is located in the vicinity of the lock mechanism 4020, cam 4012, arms foundation 4075, and the distal termini of the arms 4015. The location of the pyric disk 4080 is strategically chosen to be near the threaded 4020a proximal 11 end of the lock mechanism 4020 and its union with the cam 4012. The pyric disk 4080 is manufactured of a solder-like material that will melt when exposed to extreme heat as well as friction-related heat generated by cutting with a saw, drilling and grinding. The solder-like material should be a metal that has a melting point at least as high as the temperature commonly attained by blow-torches. The effect is to cause the cam 4012, arms foundation 4075 and the distal 12 termini of the arms 4015 to be seized in place. Gaps within the arms foundation 4075, support disk 4085, lock foundation 4090 and the cavity within the lock housing 4000a enables molten material of the melted pyric disk 4080 to migrate throughout the invention. This design, which allows molten material to migrate into the firearm, may be utilized to further dissuade unauthorized users from tampering with a firearm utilizing such an alternative design of the instant invention. It should be clear that such an alternative design is well within the scope of the present invention. Thus, pyric disk 4080 is designed as a mechanism to protect against tampering via devices such as an acetylene torch.

Although the present invention has been described with respect to this specific embodiment, it is to be understood that it is not limited thereto and all equivalents are considered covered by the following claims.

What is claimed is:

1. A device for controlling access to a firearm having a [muzzle] *barrel* with a muzzle device coupled thereto, the device comprising:

a lock housing with a base component coupled to a receptacle component, wherein the receptacle component includes a cavity configured for insertion therein of the muzzle device and at least a portion of the [muzzle] *barrel*;

a key structure coupled to the base component of the lock housing, wherein the key structure is arranged to receive a key;

a lock mechanism coupled to the key structure and arranged for actuation by the key;

a lock mechanism shaft coupled to the lock mechanism and configured for rotational movement upon actuation of the lock mechanism;

a cam having a distal end and a proximal end, wherein the distal end of the cam is in contact with the lock mechanism shaft such that rotational movement of the lock mechanism shaft causes axial movement of the cam;

a bidirectional rotatable shaft coupled to the proximal end of the cam and arranged for insertion into the [muzzle] *barrel* of the firearm;

a plurality of arms coupled to a perimeter of the cam and arranged for pivotal and radial movement to secure the firearm muzzle in the cavity of the lock housing; and a plurality of tabs arranged on the plurality of arms for engagement with an exterior surface of the muzzle device to retain the muzzle device within the lock housing.

2. The device of claim 1 further comprising near the proximal end of the cam a notched disk with circumferential notches or indentations that serve as guides to adjacent ones of the plurality of arms, wherein the notched disk is made of a material that protects distal and external surfaces of the muzzle device from abrasion and damage.

3. The device of claim 2 further comprising a conically shaped bushing located proximal to the notched disk arranged to occupy a cavity within a distal region of the muzzle device.

4. The device of claim 3 further comprising a snap ring arranged to fasten the notched disk and the conically shaped bushing together, wherein the bidirectional rotatable shaft is configured to protrude from the proximal end of the cam, penetrate through the notched disk, the conically shaped bushing and the snap ring and extend into the firearm barrel.

5. The device of claim 1 further comprising a semi-flexible, bi-directionally rotating wand coupled to a proximal end of the bidirectional rotatable shaft, wherein the wand is arranged to extend through a remainder of an internal length or bore of the barrel of the firearm and the full length of its chamber, thus preventing the loading of a live round of ammunition in the firearm.

6. The device of claim 1 wherein the plurality of arms and the tabs are configured to receive and grasp blade-like front sights that are common to most firearms including pistols, revolvers and many rifles as well as bead-like front sights common to shotguns.

7. The device of claim 1 wherein the plurality of arms and the tabs are configured to receive and grasp vertical and near-vertical serrations, cuts and other indentations of the [muzzle] *slide* of the firearm.

8. The device of claim 1 further comprising a self-protective cage-like structure arranged to protect the internal length of the device and the firearm against tampering and defeat.

9. The device of claim 8 wherein the cage-like structure includes a key disk, one or more support disks, lock housing rods or pins and a bushing, wherein the one or more support disks are located within an interior of the bushing and the lock housing configuration to provide internal lateral support against attempted compromise by crushing.

10. The device of claim 8 wherein the cage-like structure [may be] *is* configured to shelter multiple types of firearms, multiple types of muzzle devices and multiple muzzle configurations.

11. The device of claim 9 wherein the bushing enjoys bi-directional rotational freedom of movement and internally protects the entire lock housing, cavity, all components within the lock housing and at least a portion of the muzzle device.

12. The device of claim 11 wherein the bushing [may be] *is* a unitary structure or it may be a combination of bushing components.

13. The device of claim 1 further comprising a pyric disk located adjacent to the lock mechanism.

14. The device of claim 1 further comprising a lanyard retainer coupled to the lock housing.

15. The device of claim 3 wherein the conically shaped bushing is superimposed over the bidirectional rotatable shaft and serves to occupy the cavity within the distal region of the muzzle device.

16. The device of claim 15 wherein the conically shaped bushing and the notched disk center and stabilize the firearm within the cavity of the lock housing during activation so as to eliminate looseness.

* * * * *